United States Patent [19]

Engman

[11] 4,103,965
[45] Aug. 1, 1978

[54] FISHING CHAIR

[75] Inventor: Norman R. Engman, Des Moines, Iowa

[73] Assignee: Emco Industries, Inc., Des Moines, Iowa

[21] Appl. No.: 739,573

[22] Filed: Nov. 8, 1976

[51] Int. Cl.² .............................................. A47C 9/10
[52] U.S. Cl. .................................. 297/192; 297/217; 297/52
[58] Field of Search ......................... 297/51, 192, 188; 248/354 P, 354 S; 211/192; 24/261 DS, 261 DT, 261 A, 73 C, 73 SC, 86 C; 85/8.3, 8.8

[56] References Cited

U.S. PATENT DOCUMENTS

| | | | |
|---|---|---|---|
| 1,942,088 | 1/1934 | Dietrich | 248/354 S |
| 2,926,033 | 2/1960 | Zarrillo | 85/8.8 X |
| 3,077,327 | 2/1963 | Batie et al. | 297/51 X |
| 3,128,137 | 4/1964 | Dokter | 297/192 X |
| 3,187,900 | 6/1965 | Schneider | 85/8.3 |
| 3,232,686 | 2/1966 | Syler | 297/192 X |
| 3,350,855 | 11/1967 | Revell | 85/8.3 X |
| 3,893,708 | 7/1975 | Moroney | 297/DIG. 4 |
| 4,015,778 | 4/1977 | Chen et al. | 297/217 |

Primary Examiner—Francis K. Zugel
Attorney, Agent, or Firm—Zarley, McKee, Thomte, Voorhees & Sease

[57] ABSTRACT

A fishing chair comprising a pair of inverted U-shaped, two-legged folding leg sections wherein one leg of each section is pivotally secured to one leg of the other section. A collapsible seat member is carried by the upper ends of the leg sections. The connected legs are in substantially parallel adjacent relationship with each other when in a folded position and are angularly positioned relative to each other and to a supporting surface when opened. A rigid tackle box including a bottom section and a lid hingedly secured thereto is detachably secured between the legs of one of the leg sections. A pair of pins removably extend through the legs of the said one leg section and are received by openings formed in opposite ends of the lid. Each of the pins comprises an elongated shank portion which extends through the leg and into the lid. Each of the pins also includes an arcuate clip portion extending from the outer end of the shank portion which yieldably engages the leg to detachably maintain the pin in position.

1 Claim, 6 Drawing Figures

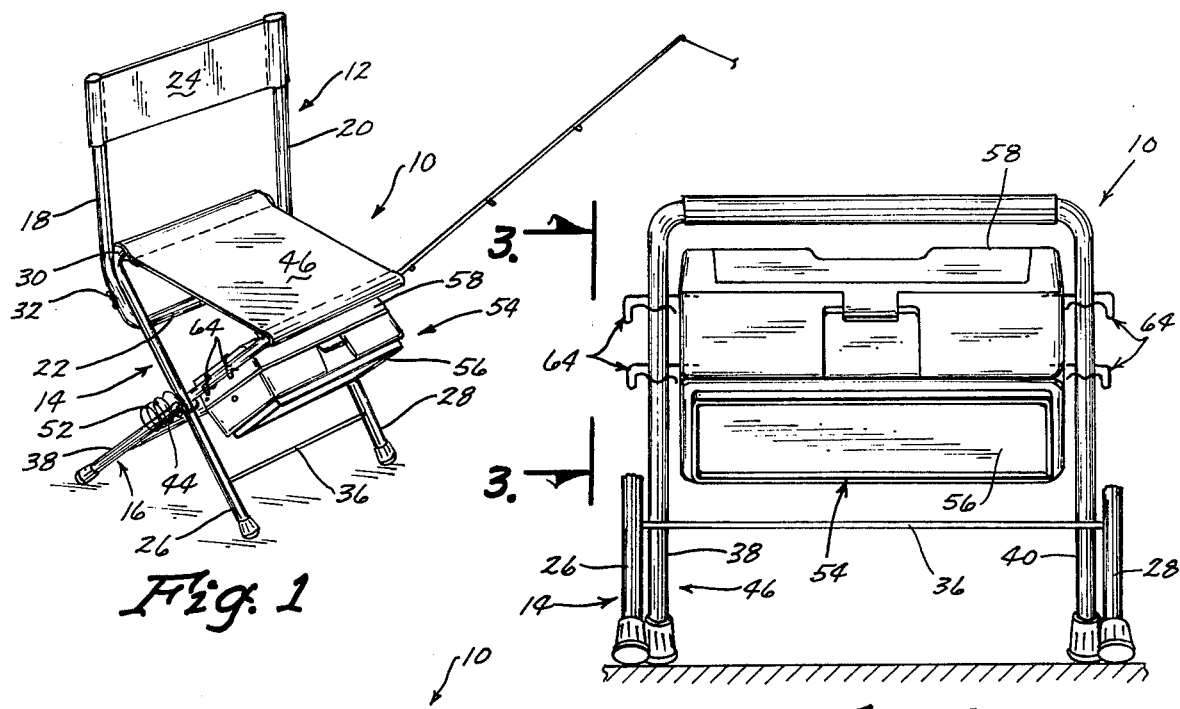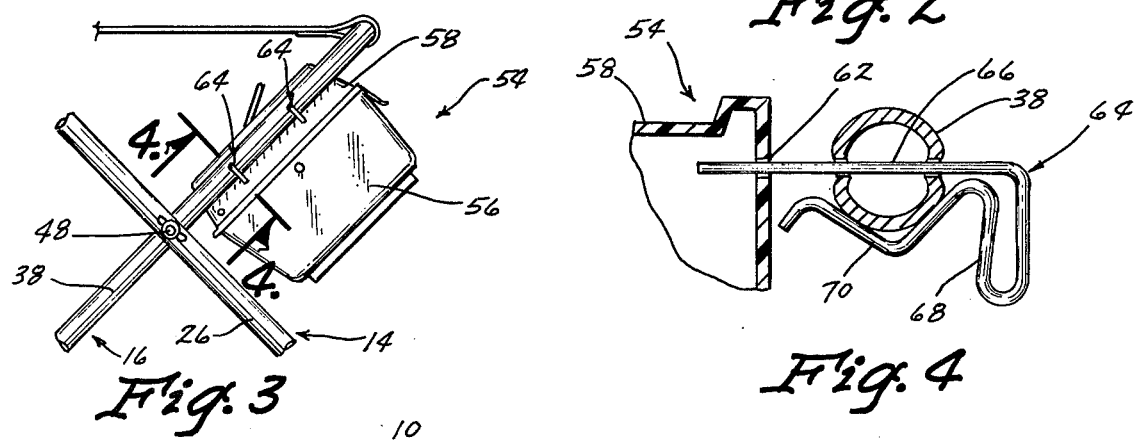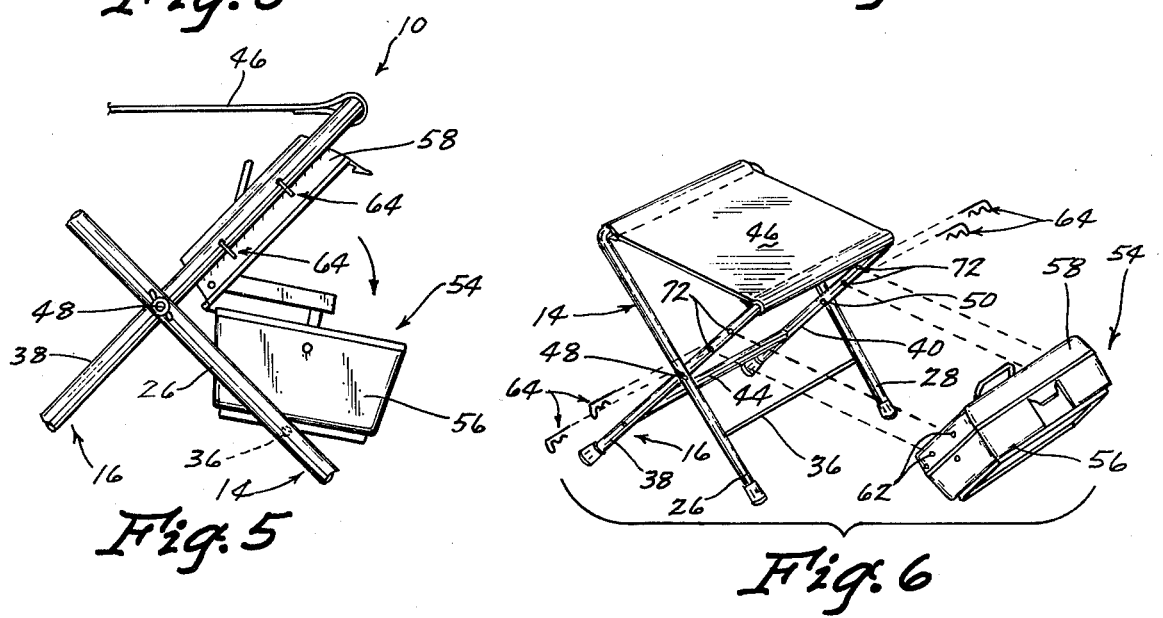

4,103,965

FISHING CHAIR

BACKGROUND OF THE INVENTION

This invention relates to a fishing chair and more particularly to a fishing chair having a tackle box removably secured thereto.

Many types of folding chairs or fishing chairs have been provided in an attempt to provide added convenience to the fisherman. One such type of chair is disclosed in U.S. Pat. No. 3,077,327 and can be seen to include a rigid tackle box secured to and positioned between a pair of legs of the folding leg sections. However, in the folding chair of U.S. Pat. No. 3,077,327, the tackle box was permanently affixed to the folding leg sections of the chair which prevented the tackle box from being used separately or conveniently used when the chair was not positioned in its ground supported condition Therfore, it is a principal object of the invention to provide an improved folding chair.

A still further object of the invention is to provide a fishing chair including a rigid tackle box removably secured to the chair.

A still further object of the invention is to provide a fishing chair including novel means for removably securing a rigid tackle box thereto.

A still further object of the invention is to provide a fishing chair which is economical to manufacture, durable in use and refined in appearance.

These and other objects will be apparent to those skilled in the art.

SUMMARY OF THE INVENTION

A fishing chair comprising a pair of inverted U-shaped folding leg sections pivotally connected together and having a collapsible seat member secured to the upper ends thereof. A rigid tackle box is positioned between the legs of one of the leg sections and is removably secured thereto by means of spring clip type pins extending through the legs of the leg section and being received in openings formed in opposite ends of the lid of the tackle box. Each of the pins comprises an elongated shank portion having an arcuate clip portion extending therefrom which is adapted to yieldably embrace a portion of the leg.

BRIEF DESCRIPTION OF THE DRAWINGS

FIG. 1 is a front perspective view of the fisherman's chair of this invention:

FIG. 2 is a partial front view of the chair:

FIG. 3 is a view as seen on lines 3—3 of FIG. 2:

FIG. 4 is an enlarged sectional view seen on lines 4—4 of FIG. 3:

FIG. 5 is a view similar to FIG. 3 except that the tackle box has been moved to an open position; and FIG. 6 is a partial exploded perspective view of the fisherman's chair of this invention.

DESCRIPTION OF THE PREFERRED EMBODIMENT

The chair of this invention is referred to generally by the reference numeral 10 and generally comprises a back portion 12 pivotally connected to a pair of inverted U-shaped, two legged folding leg sections 14 and 16. Back portion 12 includes legs 18 and 20 having a base portion 22 extending between the lower ends thereof. A flexible support 24 extends between the upper ends of legs 18 and 20 as seen in FIG. 1.

Leg section 14 comprises legs 26 and 28 having base portion 30 extending between the upper ends thereof. Back portion 12 is pivotally secured to legs 26 and 28 adjacent the upper ends thereof by means of bolts 32 and 34 (not shown) extending therebetween. Brace 36 is secured to and extends between legs 26 and 28 adjacent the lower ends thereof as illustrated in FIG. 1.

Leg section 16 generally comprises legs 38 and 40 having base portion 42 extending between the upper ends thereof. Brace 44 is secured to and extends between legs 38 and 40 adjacent the lower end thereof. The numeral 46 refers to a collapsible seat portion which has its ends secured to base portions 30 and 42 in the manner illustrated in the drawings. Sections 14 and 16 are pivotally secured together by means of bolt assemblies 48 and 50. The sections 14 and 16 are pivotally movable from a folded condition wherein the connected legs are in substantially parallel adjacent relationship with each other and are angularly positioned relative to each other and to a supporting surface when in an open position. A fishing pole or rod holder 52 is preferably secured to each of the legs 26 and 28.

The numeral 54 refers generally to a rigid tackle box generally comprising a bottom section 56 having a lid 58 hingedly secured thereto. Lid 58 is maintained in a closed position relative to bottom 56 by means of closure 60. Lid 58 is provided with a pair of spaced-apart openings 62 formed in the opposite ends thereof. The tackle box 54 is detachably secured to and between the legs 38 and 40 by means of four pins 64. Each of the pins 64 generally comprise an elongated shank portion 66 having an arcuate spring clip portion 68 extending from the outer end thereof. Spring clip portion 68 includes a V-shaped portion 70 adapted to partially embrace the leg as illustrated in FIG. 4. As seen in FIG. 6, legs 38 and 40 are each provided with a pair of spaced-apart openings 72 formed therein adjacent the upper ends thereof which are adapted to receive the shank portions 66 of the pins 64. Thus, the elongated shank portions 66 of each of the pins 64 extend through one of the openings 72 in the legs and has its inner end removably received by one of the openings 62 formed in the lid 58. When in the position of FIG. 4, the V-shaped portion 70 yieldably embraces a portion of the leg to yieldably maintain the pin in the position of FIG. 4. Thus, it can be seen that when the chair is in the open position of FIG. 3, the tackle box 54 is positioned between the legs of leg section 16. If the fisherman desires access to the interior of the tackle box 54, he simply opens closure 60 to permit bottom 56 to pivotally move downwardly relative to the lid 58 to the position of FIG. 5. If the fisherman desires to use the tackle box without the chair, he simply removes the pins 64 from the legs so that the tackle box 54 may be removed therefrom.

Thus it can be seen that a unique fisherman's chair has been provided wherein a tackle box is detachably positioned between a pair of the legs of one of the folding leg sections. The tackle box is normally maintained in position between the legs to permit the fisherman to gain convenient access to the interior of the tackle box. It can also be seen that the tackle box may be easily and quickly removed from the chair as desired. Thus it can be seen that the chair of this invention accomplishes at least all of the stated objectives.

I claim:

1. A fishing chair comprising:

a pair of inverted U-shaped, two legged folding tubular leg sections wherein one leg of each section is pivotally secured to one leg of the other section, a support brace securely mounted between each of said U-shaped leg sections, a collapsible seat member carried by said leg sections, a plurality of pins having an elongated shank portion and a V-shaped spring clip portion for yieldably embracing a portion of said tubular leg to yieldably maintain said pin on said leg, and a tackle box including a lid having a plurality of pin receiving apertures and a bottom section hingedly secured thereto and positioned between one of said leg sections such that said bottom section opens forwardly and downwardly relative to an occupant's position on said seat member with said leg section having a plurality of pin receiving apertures therethrough with said shank portion being of such greater length than said V-shaped clip portion so as to extend through said leg apertures into said lid apertures to support said tackle box and said V-shaped clip portion embraces said leg thereby detachably securing said tackle box to said leg section.

* * * * *